Patented Aug. 8, 1944

2,355,146

UNITED STATES PATENT OFFICE 2,355,146

METHOD OF TESTING CARBON BLACK

Samuel C. Carney, Bartlesville, Okla., assignor to Phillips Petroleum Company, a corporation of Delaware No Drawing. Application April 12, 1943, Serial No. 482,817

9 Claims. (Cl. 23—230)

This invention relates to a method of testing carbon black and more particularly it relates to a direct laboratory method of testing carbon black to determine its effectiveness for use in the reinforcement of rubber.

An object of my invention is the development of a laboratory method for testing the effectiveness of carbon black as a reinforcing agent for rubber.

Another object of my invention is the development of a rapid laboratory method requiring the use of little apparatus for the testing of the effectiveness of carbon black in the reinforcement of rubber.

Still another object of my invention is the development of a simple and speedy method for the quantitative testing of the rubber reinforcing properties of carbon black, not to replace, but to supplement the conventional rubber batch testing.

Still other objects and advantages will be apparent to those skilled in the art from a careful study of the following detailed disclosure.

Advantages of the method of my invention over known methods are due to the fact that no method is known for testing the reinforcing properties of carbon black or other materials in rubber or synthetic plastics except by trial. An actual trial of a sample of black in a rubber batch is of course conclusive and will give more accurate and more complete information than will the method of this invention. But to make such an actual trial requires the use of:

(a) Power driven rolls for breaking down or masticating the raw rubber and for dispersing the carbon black and other ingredients in the rubber;

(b) A heated hydraulic press in which a sample sheet of the compounded rubber may be vulcanized under pressure;

(c) Apparatus for the simultaneous measurement of elongation and stress placed upon a sample of the vulcanized compound of standard dimension, so that tensile strength and modulus may be determined;

(d) Apparatus for abrading a standard sample;

(e) Apparatus for determining numerous other properties of the compounded rubber such as resilience, hardness, extrusion value, hysteresis, etc.

It will be noted that none of these are tests of the black itself and tests such as finding the density of black, the per cent soluble in various solvents, its absorption capacity for diphenyl guanidine, etc., have no definite relation to its reinforcing value.

The process of my invention is not designed to replace the functional tests in a rubber mixture, as described, but instead is designed for use in conjunction with experimental methods for producing black from various raw materials or for discovering other materials which have somewhat similar or analogous properties, or in observing results of processes of modifying reinforcing properties of carbon black or other materials useful in compounding rubber.

The advantages of my method are its speed, small amount of apparatus, low expense for materials and equipment, and especially the fact that it gives visual indication of the extent of possession by the sample of black being tested of a major property which, though I do not fully understand it, is the property most concerned in the effects of carbon black upon rubber or similar substances. It may be said also, with reasonable, though not perfect accuracy, that the test by my method gives a visual, but indirect, indication of the particle size of the black being tested. Though it is known to those skilled in the art that carbon black particles cannot be seen with optical microscopes but may be directly observed only by use of the relatively new electron microscope, my method gives an indirect indication which I believe is due to a combination of particle size and the shape or character of surface of the particles, and may be seen in its more obvious aspect with the naked eye or more effectively by use of optical microscopes, preferably binocular, at magnification on the order of 50 to 200 diameters.

There is known in the carbon black trade a broad colloquial qualitative classification of rubber blacks as "hard" and "soft." The origin of the terms "hard" and "soft" has to do with the relative plasticity of a rubber batch containing the black in question, primarily while it is being processed in the mixing rolls or Banbury mixer. A "hard" black stiffens the batch and thereby increases the heat developed, which in extreme cases may lead to such a temperature rise as to cause the premature vulcanization known as "scorching." With a soft black, on the other hand, plasticity is not so reduced and the batch is more easily processed and when mixed may be more easily extruded into desired shapes. The "hard" blacks, though they make the rubber more difficult to process, give it greater resistance to abrasion and greater tensile strength and so are normally preferred in tread stocks. For example, with synthetic rubbers, especially "Buna S," this property known as "hardness" is so troublesome in the processing that softer blacks are found desirable, but grades are preferred still not so "soft" as those previously classed as "soft" blacks.

While persons skilled in the art can, in general, distinguish between "hard" and "soft" blacks by inspection of their color, density, and feel to the sense of touch, no testing method is known for appraisal of this quality. Based on the process of their production, it is broadly true that blacks made by the Channel process are "hard" and those made by furnace processes are "soft." Due to improvements in furnace processes with the intent to make their product "harder" and with recent changes in Channel processes with the intent to make their products "softer" for use with synthetic rubbers, the distinction by process of production is becoming less clear than formerly.

It is also known, or at least generally accepted in the trade as true, that the property of "hardness" parallels the particle size of the blacks in question. That is to say, in general, the smaller the particle size the greater the "hardness" of the black. This is true even when one includes the class of color blacks. These color blacks have the smallest known particle size and though not used in rubber on account of their high price, it is known experimentally that in a rubber batch they have in extreme degree the property of "hardness."

I have discovered a natural phenomenon, which I believe to be hitherto unknown, by the observation of which under standardized conditions, this quality, vaguely known as "hardness," may be quantitatively appraised. I shall describe it with reference to sodium chloride, though it may be observed by the use of many other crystalline substances.

Sodium chloride is well known to crystallize normally in the cubic system. I have discovered that if one arrange on watch glasses a series of blacks ranging from an extreme hard sample, typified by the color black known as "Carbolac," through other grades of color blacks of less intense color, and through grades of intermediate hardness typified by numerous Channel blacks such as Kosmobile and Spheron, down to grades of soft black typified by such well known grades as Gastex and Thermax, that these may be classified in the order of their known reinforcing properties in rubber by use, for example, of sodium chloride.

If each sample of black of standardized weight, for example, 1 gram, be wetted with a standardized amount of NaCl solution in water, for example 2 cc. of saturated solution and, after thorough mixing, be dried, a profound difference will be noted in the NaCl crystals formed in the presence of the different samples.

1. With none of the samples will the salt crystallize in its normal cubic form.
2. With all samples drying under identical conditions, there will be substantial differences in the time required for formation of the first crystal.
3. There will be substantial differences in the rate of crystal growth.
4. There will be great differences in the shape of the crystals formed.
5. There will be great differences in the size and number of crystals formed.

The same phenomena will occur when numerous crystalline substances other than sodium chloride are used in a similar manner, but with other substances the size, shape and general character of crystals formed, though in many cases differing from the normal crystal form of the substance, will not be the same as with sodium chloride. Though I have experimented with magnesium sulphate, copper sulphate, sodium thiosulphate, tri-cyclo-decane stearic acid, iodine, potassium iodide, camphor, potassium permanganate, ammonium chloride, potassium ferricyanide, and other crystalline substances, each dissolved in an appropriate solvent, I continue with sodium chloride as an example.

1. With soft blacks the salt will crystallize in forms relatively large in volume, but not separated into individual crystals, and bounded by a variety of curved surfaces, the distinctive angles between plane faces being absent.
2. With somewhat increased hardness found in some types of furnace black the size of the relatively formless crystals will decrease as their number increases and they will be distributed more uniformly over the sample.
3. With further increase in "hardness" the formless crystals substantially disappear and crystallization takes the form of heavily striated needles of indefinite shape of cross section, the length of these needles being short relative to their cross section.
4. At the range of "hardness" covered by commercial Channel blacks as made during 1941, all crystals are in needle form with their length and number increasing with increasing hardness as the cross sectional diameter of the needles decreases, and their rate of growth increases.
5. In the range of "hardness" covered by color blacks, the diameter of the needles further decreases with corresponding increase in length so that the needles curve under their own weight and to the naked eye they resemble filaments of a textile fiber and some are so fine as to be just visible at a magnification of 50 diameters. With a black of intense color and very fine particle size, the number and fineness of the crystalline filaments was such that the actual movement of the crystals in formation was plainly visible with a binocular microscope at magnification of 72 diameters. They were seen to be formed beneath the surface of the paste of carbon and salt solution and to be projected upwards as if by extrusion.

With no quantitative measurement whatever, this variation in length and diameter of needle crystals furnishes a means of appraisal of the quality of blacks of the same character as the well known commercial grading of cotton by visual inspection of its fiber.

Quantitative values are readily attained which may be expressed numerically by use of the three factors of number of filaments in a specified area of microscopic field, the average or maximum length of crystal seen in that field, the time required for attaining that length under standardized drying conditions.

Since a black of extreme hardness, as determined by this test, will require approximately four times as much solution to wet it to a given consistency as will one of medium hardness, the test may be given numerical value by the weight of black required to produce the first needle crystal under standardized drying conditions from a standard weight of solution.

Though I have described the test using sodium chloride as an example, I do not limit myself to its use. Potassium chloride solution produces finer needles with a given grade of black than does sodium chloride. Ammonium chloride produces more numerous, but shorter needles than either potassium or sodium chlorides. I have also found that the addition of a small amount of acetone, up to 10% by volume, to the water solution of a salt does not interfere with the test and greatly facilitates the wetting of many of the softer grades of black.

Though I have found, for example, that some blacks of medium hardness almost completely inhibit crystallization of sodium thiosulphate, and that a mixed solution of cuprous and sodium chlorides in the presence of hard black crystallizes in very perfect cubes, the number of possible crystalline substances is so great that I have not observed the effect of various blacks on very many of them.

Though I am not certain of the correctness of my theory, I believe that the property known as "hardness" is that property which produces in rubber and synthetic plastics a fibrous crystalline structure by means of its influence on molecular orientation. On account of the high molecular weight of rubber and similar substances, the mol per cent of carbon black used in compounding them is very high. This same unknown force of carbon black, I believe, promotes the linear arrangement of molecules of many other substances, more readily crystallizable when present in smaller mol per cent. The soft blacks, I believe, promote a structure in rubber and similar substances which is relatively free from interlaced linear molecules. As their power to control or modify molecular orientation in crystals of inorganic salts is much less than that of the hard blacks, so, I believe, is their ability to convert amorphous plastic rubber constituents to the oriented crystalline fibrous form.

While the aforegiven disclosure enumerated the effect of various types of carbon blacks on the crystal habits of sodium chloride in water solution, other salt solutions, as mentioned above, may be used. In addition, it was stated that the salt solution used in this testing was a saturated water solution, but other solutions strengths may be used. A saturated solution is used solely to present a sufficient amount of the salt and to facilitate evaporation or to shorten the evaporation time. The relative amounts of the ingredients of the test may be varied at the discretion of the operator, but to give dependable and reproducibly uniform results, the test conditions such as amount of carbon black, amount of salt solution, drying period or time, etc., must be uniform. Thus for a given set of test conditions the operator will become familiar with the crystal habits of the salt used and he may then by observation be able to segregate carbon blacks according to their degree of "hardness."

I do not wish to be limited by any theory or explanation of the possible reasons for the particular behavior of carbon blacks in rubber, or as to why the presence of various types of carbon blacks have the pronounced effect on the crystallization of the salt, but only by the appended claims.

While I have given definite details for carrying out my invention, I have done so for purposes of illustration only, and these details may be modified and altered within rather wide limits and remain within the intended scope and spirit of my invention.

What I claim is:

1. A method of determining the rubber reinforcing properties of carbon black comprising mixing carbon black with a solution of a crystalline substance in an appropriate solvent for the substance, evaporating the solvent from the mixture and observing the crystal formation as a measure of the rubber reinforcing properties of the carbon black.

2. A method of determining the rubber reinforcing properties of carbon black comprising mixing carbon black with a solution of an organic crystalline substance in an appropriate solvent for the substance, evaporating the solvent from the mixture and observing the crystal formation as a measure of the rubber reinforcing properties of the carbon black.

3. A method of determining the rubber reinforcing properties of carbon black comprising mixing carbon black with a solution of an inorganic crystalline substance in an appropriate solvent for the substance, evaporating the solvent from the mixture and observing the crystal formation as a measure of the rubber reinforcing properties of the carbon black.

4. A method of determining the rubber reinforcing properties of carbon black comprising mixing carbon black and an aqueous salt solution, evaporating the water from the mixture and observing the salt crystal formation as a measure of the rubber reinforcing properties of the carbon black.

5. A method of determining the rubber reinforcing properties of carbon black comprising mixing carbon black and a saturated aqueous salt solution, evaporating the water from the mixture and observing the salt crystal formation as a measure of the rubber reinforcing properties of the carbon black.

6. A method of determining the rubber reinforcing properties of carbon black comprising mixing carbon black and a saturated solution of sodium chloride, evaporating the water from the mixture and observing the salt crystal formation as a measure of the rubber reinforcing properties of the carbon black.

7. A method for determining the rubber reinforcing properties of carbon black as indicated by the modification of the crystal structure of an inorganic salt upon crystallizing from a solution of that salt in the presence of carbon black comprising mixing carbon black and an aqueous salt solution, evaporating the water from the mixture and observing the salt crystal formation as modified by the carbon black, said crystal form being a measure of the rubber reinforcing properties of the carbon black.

8. A method for determining the rubber reinforcing properties of carbon black as indicated by the modification of the crystal structure of an inorganic salt upon crystallizing from a solution of that salt in the presence of carbon black comprising mixing carbon black and a saturated aqueous salt solution, evaporating the water from the mixture and observing the salt crystal formation as modified by the carbon black, said crystal form being a measure of the rubber reinforcing properties of the carbon black.

9. A method for determining the rubber reinforcing properties of carbon black as indicated by the modification of the crystal structure of an inorganic salt upon crystallizing from a solution of that salt in the presence of carbon black comprising mixing carbon black and a saturated aqueous solution of sodium chloride, evaporating the water from the mixture and observing the sodium chloride crystal formation as modified by the carbon black, said crystal form being a measure of the rubber reinforcing properties of the carbon black.

SAMUEL C. CARNEY.